United States Patent
Yanagawa (10) Patent No.: US 9,843,696 B2
(45) Date of Patent: Dec. 12, 2017

(54) IMAGE FORMING APPARATUS, METHOD FOR CONTROLLING IMAGE FORMING APPARATUS, AND STORAGE MEDIUM

(71) Applicant: CANON KABUSHIKI KAISHA, Tokyo (JP)

(72) Inventor: Katsuhiko Yanagawa, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/693,701

(22) Filed: Apr. 22, 2015

(65) Prior Publication Data
US 2015/0312435 A1    Oct. 29, 2015

(30) Foreign Application Priority Data
Apr. 25, 2014   (JP) .................................. 2014-091225

(51) Int. Cl.
H04N 1/00     (2006.01)
G06K 15/00    (2006.01)

(52) U.S. Cl.
CPC .............................. H04N 1/00978 (2013.01)

(58) Field of Classification Search
CPC .  G06F 1/20; G06F 1/203; G06F 1/206; G06F 9/30083; G06F 11/3058; G03G 21/20; H04N 1/00978; H04N 1/00981
USPC ....... 358/1.11–1.18, 504, 406, 404; 713/300, 713/320, 323, 324, 330; 702/130; 399/33, 44, 69, 94, 97
See application file for complete search history.

(56) References Cited

U.S. PATENT DOCUMENTS

| | | | | | |
|---|---|---|---|---|---|
| 5,590,061 | A | * | 12/1996 | Hollowell, II | .......... G06F 1/206 702/130 |
| 7,317,467 | B2 | * | 1/2008 | Shepherd | ............. G03G 21/206 347/133 |
| 2009/0110418 | A1 | * | 4/2009 | Ogiso | ................ G03G 15/2039 399/44 |
| 2009/0136242 | A1 | * | 5/2009 | Okamoto | ............... G03G 21/20 399/13 |
| 2011/0142476 | A1 | * | 6/2011 | Tsunoda | ............. G03G 15/5004 399/70 |
| 2011/0187800 | A1 | * | 8/2011 | Freitag | ................. B41J 2/17503 347/85 |
| 2013/0107332 | A1 | * | 5/2013 | Tang | .................. H04N 1/00909 358/483 |
| 2014/0079533 | A1 | * | 3/2014 | Kitano | ............... H05K 7/20136 415/1 |

FOREIGN PATENT DOCUMENTS

| | | | | |
|---|---|---|---|---|
| JP | 08254939 | A | * | 10/1996 |
| JP | 11084991 | A | * | 3/1999 |
| JP | 2004325873 | A | * | 11/2004 |
| JP | 2005148105 | A | * | 6/2005 |
| JP | 2006-167968 | A | | 6/2006 |
| JP | 2006167968 | A | * | 6/2006 |

* cited by examiner

*Primary Examiner* — Chad Dickerson
(74) *Attorney, Agent, or Firm* — Canon USA Inc., IP Division (57) ABSTRACT

An image forming apparatus includes a control unit configured to control writing or reading data to or from a storage unit and a cooling unit configured to cool the control unit and the storage unit, in which the control unit reads temperature information from the storage unit, and changes a timing of when to read the temperature information next from the storage unit and a cooling level of the cooling unit in conjunction with each other.

14 Claims, 7 Drawing Sheets

| SMART TEMPERATURE INFORMATION | COOLING FAN OPERATION | ALARM SETTING TIME |
|---|---|---|
| 50°C OR HIGHER | FULL SPEED | 5 MINUTES |
| 45°C OR HIGHER AND LESS THAN 50°C | HALF SPEED | 10 MINUTES |
| 40°C OR HIGHER AND LESS THAN 45°C | STOP | 5 MINUTES |
| 30°C OR HIGHER AND LESS THAN 40°C | STOP | 10 MINUTES |
| LESS THAN 30°C | STOP | 20 MINUTES |

FIG. 7

IMAGE FORMING APPARATUS, METHOD FOR CONTROLLING IMAGE FORMING APPARATUS, AND STORAGE MEDIUM

BACKGROUND OF THE INVENTION

Field of the Invention

The present invention relates to an image forming apparatus, a method for controlling the image forming apparatus, and a storage medium.

Description of the Related Art

As an image forming apparatus, there is known a digital multifunction peripheral having a copy function that reads a document with a scanner to copy the document, and a print function that prints print data transmitted to an image forming apparatus from a personal computer (PC) via a network. In addition to the above functions, the digital multifunction peripheral has multiple functions including an image data transmission function that transmits image data read by a scanner to a PC, an image data storage function that stores image data therein so as to reuse the data, and a facsimile function using a public telephone line.

The configuration of this type of the digital multifunction peripheral has become complicated because of realizing the multi-functional configuration described above. In particular, the number of programs has increased along with complication in software structure and the capacity of a storage device for storing image data has also increased. Nowadays, it is common to mount a hard disk drive (HDD) on the digital multifunction peripheral.

An operating temperature range is specified for the HDD mounted on an image forming apparatus. The specified operating temperature range of a typical HDD is from 5° C. to 55° C. It is common to cool the HDD with a cooling fan to operate the HDD within the specified operating temperature range.

However, operating the cooling fan generates operating noise to impair the quietness of the image forming apparatus. To solve this problem, Japanese Patent Application Laid-Open No. 2006-167968 discusses control that references temperature information of self-monitoring analysis and reporting technology (SMART), which is a self-diagnosis function of the HDD, to operate the cooling fan at the minimum required level according to the temperature information.

On the other hand, the HDD has a loading state in which a magnetic head is located on a disk surface and an unloading state in which the magnetic head is retracted into an area called a ramp outside the disk surface. There is defined the upper limit of the number of times of loading/unloading, which is the number of times of transition between the two states. If the number of times of the loading/unloading exceeds the upper limit, the reliability of the HDD decreases. In a typical HDD, the upper limit is 600 thousand times. If the data in the HDD is accessed or the temperature information of the SMART is read, the HDD shifts to the loading state. If the data or the SMART has not been accessed for a certain period of time, the disc head is retracted and the HDD shifts to the unloading state.

However, in Japanese Patent Application Laid-Open No. 2006-167968, the HDD shifts to the loading state when the temperature information of the SMART is read. If the preceding state is the unloading state, the number of times of the loading/unloading is increased by one. If such a transition is repeated at an interval of one minute, the number of times of loading/unloading exceeds the upper limit of 600 thousand times in a little over a year, which causes a problem that the reliability of the HDD, that is, the reliability of the image forming apparatus is lowered.

SUMMARY OF THE INVENTION

The present invention is directed to a mechanism that can increase the reliability of a storage unit by suppressing a frequency at which temperature information is read from the storage unit and noise generated at the time of cooling the storage unit.

According to an aspect of the present invention, an image forming apparatus includes a control unit configured to control writing or reading data to or from a storage unit, and a cooling unit configured to cool the control unit and the storage unit, in which the control unit reads temperature information from the storage unit, and controls a timing of when to read the temperature information next from the storage unit and a cooling level of the cooling unit.

According to an exemplary embodiment of the present invention, the reliability of the storage unit can be improved by suppressing the frequency at which temperature information is read from the storage unit and the noise generated at the time of cooling the storage unit.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

<Description of System Configuration>

Figure 1:
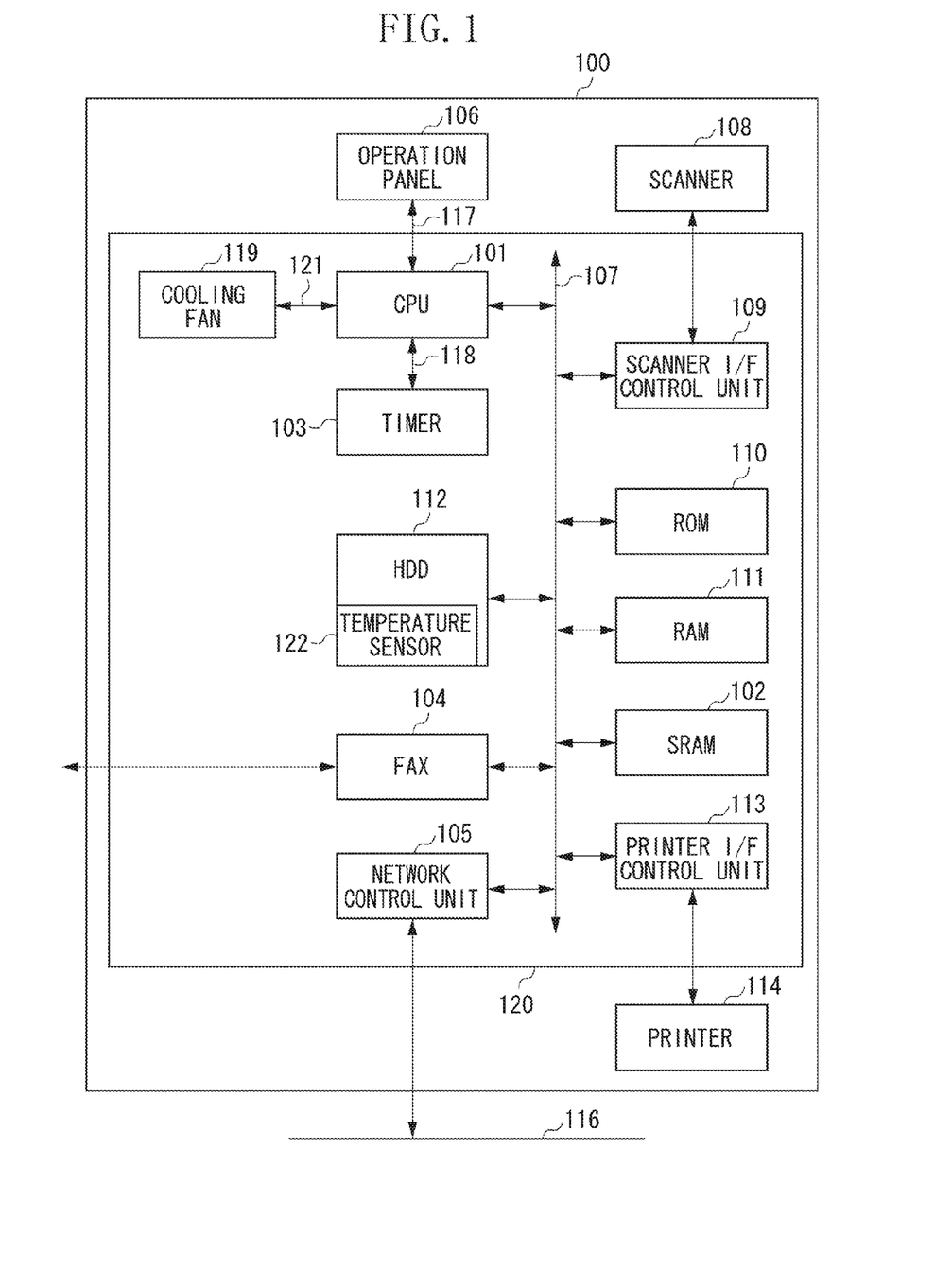
FIG. 1 is a block diagram illustrating a configuration of an image forming apparatus.

FIG. 1 is a block diagram illustrating a configuration of an image forming apparatus according to a first exemplary embodiment. The following describes a controller unit 120 serving as a central function of an image forming apparatus 100.

In FIG. 1, a central processing unit (CPU) 101 controls the entire part of the image forming apparatus 100. A read only memory (ROM) 110 stores a boot program and fixed parameters of the image forming apparatus 100. A random access memory (RAM) 111 is used to temporarily store data when the CPU 101 controls the image forming apparatus 100. A HDD 112 is used to store various data such as image data. The HDD 112 incorporates a temperature sensor 122 for detecting the temperature of the main body of the HDD 112 that is heated. The HDD 112 further includes self-monitoring analysis and reporting technology (SMART) which is a self-diagnosis function. The SMART manages a reading error occurrence rate, a reading and writing speed, the number of times of loading/unloading of the magnetic head, and information about temperature measured by the temperature sensor 122.

A printer 114 prints image data generated by the controller unit 120 on a sheet. A printer interface (I/F) control unit 113 transmits image data and controls the printer 114. A scanner 108 reads a document. A scanner interface (I/F) control unit 109 receives image data read by the scanner 108, which serves as a document reading unit, and controls the scanner 108.

A static random access memory (SRAM) 102 stores various setting values of the image forming apparatus 100. Since the SRAM 102 is a volatile memory, a power source is supplied by a battery (not illustrated) to back up the SRAM 102 to retain data while the image forming apparatus 100 is turned off. A timer 103 has a clock function and generates an alarm interrupt at a specified time. Similarly to the SRAM 102, a power source is supplied to the timer 103 by a battery to continue timing even while the image forming apparatus 100 is turned off.

A facsimile communication control unit (FAX) 104 controls data transmission and reception via a public telephone line. A network control unit 105 controls data transmission and reception via a network 116. An operation panel 106 displays various types of information and receives an input from a user. A bus 107 is connected to the CPU 101, the SRAM 102, the FAX 104, the network control unit 105, the scanner I/F control unit 109, the ROM 110, the RAM 111, the HDD 112, and the printer I/F control unit 113. The bus 107 is a system bus via which a control signal from the CPU 101 and a data signal between the units are transmitted and received.

A bus 117 is provided through which the CPU 101 controls the operation panel 106. A bus 118 is provided through which the CPU 101 controls the timer 103. A cooling fan 119 cools the controller unit 120 including the HDD 112. A bus 121 is provided through which the CPU 101 controls the cooling fan 119. The cooling fan 119 can change its rotation speed by switching a voltage supplied thereto. In the present exemplary embodiment, the cooling fan 119 can be operated at full rotation speed or at half rotation speed which is approximately half of the full rotation speed.

Figure 2:
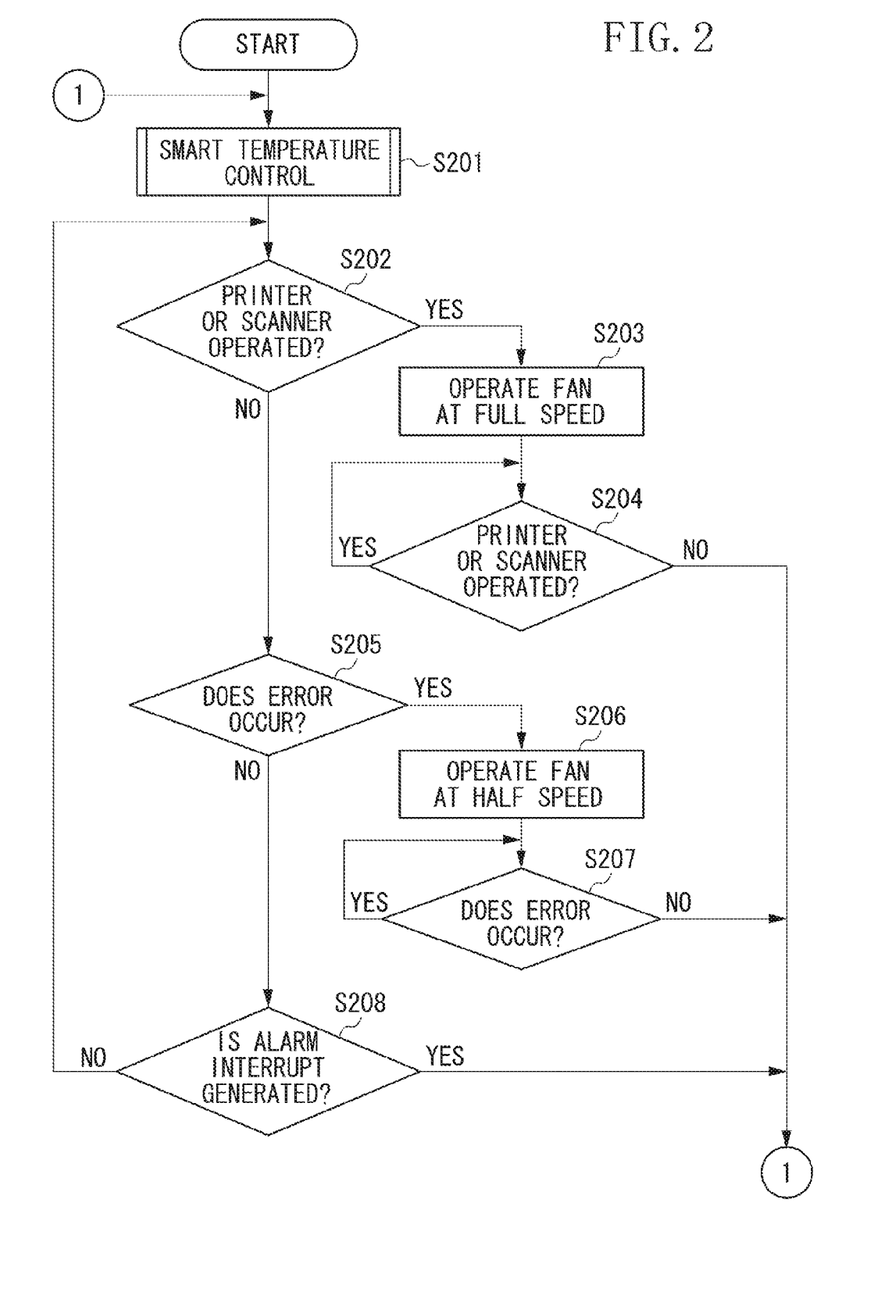
FIG. 2 is a flowchart illustrating a method for controlling the image forming apparatus.

FIG. 2 is a flowchart illustrating a method for controlling the image forming apparatus 100 according to the present exemplary embodiment. This example corresponds to an example of fan control operation performed by the CPU 101 for controlling the cooling fan 119 illustrated in FIG. 1. Each step is realized by the CPU 101 executing a control program stored in the ROM 110.

In step S201, the CPU 101 executes a subroutine "SMART temperature control". A detailed operation of the CPU 101 in the subroutine "SMART temperature control" in step S201 will be described below with reference to a flowchart illustrated in FIG. 3.

After the subroutine "SMART temperature control" in step S201 is executed, in step S202, the CPU 101 determines whether the printer 114 or the scanner 108 is operated. If the CPU 101 determines that the printer 114 or the scanner 108 is operated (YES in step S202), in step S203, the CPU 101 operates the cooling fan 119 at full speed. In step S204, the CPU 101 determines whether the printer 114 or the scanner 108 is operated. If the CPU 101 determines that the printer 114 or the scanner 108 is not operated (NO in step S204), the processing returns to step S201.

On the other hand, if the CPU 101 determines that the printer 114 or the scanner 108 is not operated (NO in step S202), in step S205, the CPU 101 determines whether an error such as a jam occurs. If the CPU 101 determines that an error occurs (YES in step S205), in step S206, the CPU 101 operates the cooling fan 119 at half speed. In step S207, the CPU 101 determines whether an error occurs. If the CPU 101 determines that an error does not occur (NO in step S207), the processing returns to step S201.

On the other hand, if the CPU 101 determines that an error such as a jam does not occur (NO in step S205), in step S208, the CPU 101 determines whether the timer 103 generates an alarm interrupt. If the CPU 101 determines that the timer 103 generates an alarm interrupt (YES in step S208), the processing returns to step S201.

If the CPU 101 determines that the timer 103 does not generate an alarm interrupt (NO in step S208), the processing returns to step S202.

Figure 3:
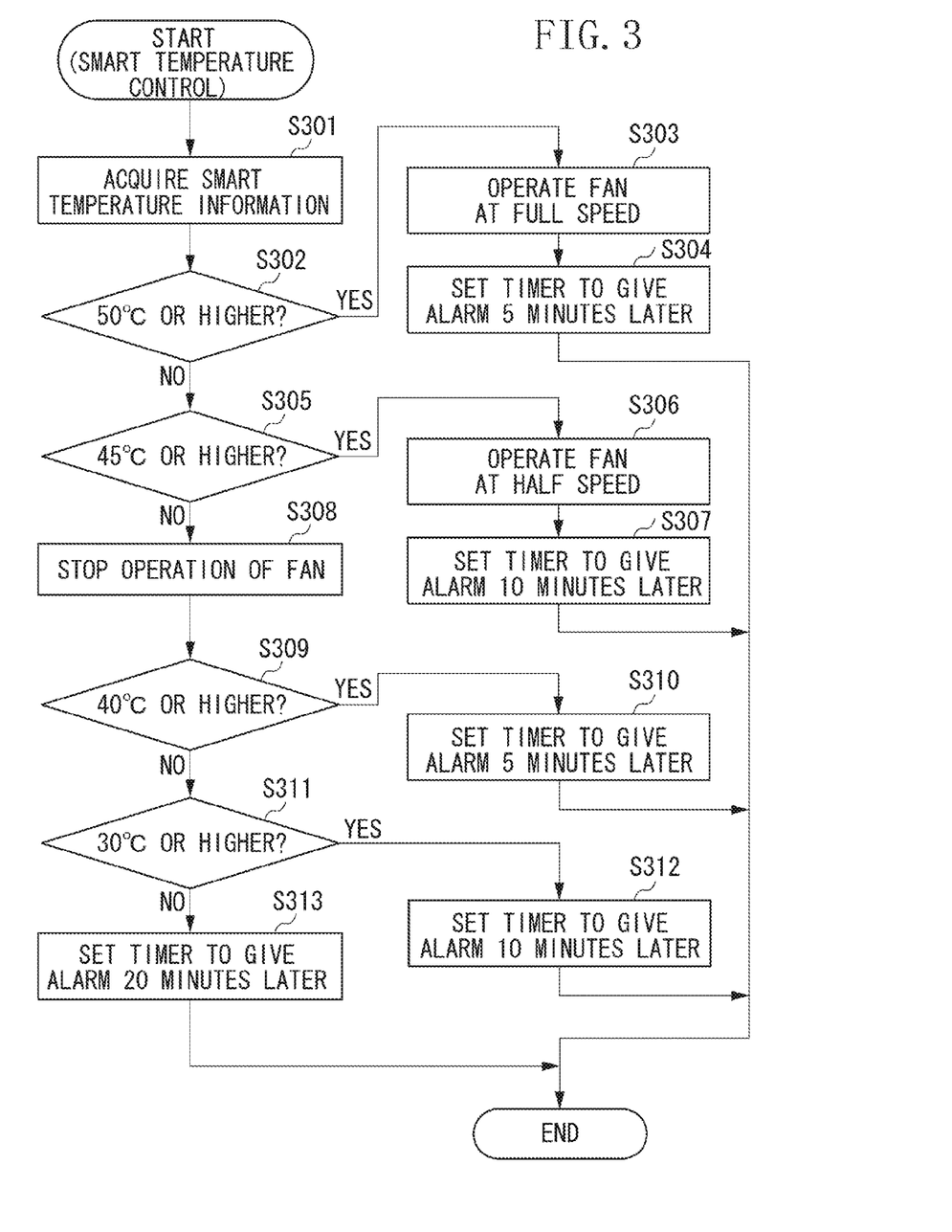
FIG. 3 is a flowchart illustrating a method for controlling the image forming apparatus.

FIG. 3 is a flowchart illustrating a method for controlling the image forming apparatus 100 according to the present exemplary embodiment. This example corresponds to detailed procedure for the subroutine "SMART temperature control" in step S201. Each step is realized by the CPU 101 executing a control program stored in the ROM 110. The following describes an example of determining whether the temperature identified by information about temperature measured by a self-diagnosis function of the HDD 112 is lower than a predetermined threshold value (45° C., 40° C., or 30° C.) and then changing the timing of when to acquire the temperature information next. At the same time, the following describes in detail an example in which the CPU 101 adjusts the cooling level of cooling operation of the cooling fan 119.

In step S301, the CPU 101 accesses the SMART of the HDD 112 to acquire temperature information. In step S302, the CPU 101 determines whether the temperature information acquired in step S301 is 50° C. or higher. If the CPU 101 determines that the temperature information is 50° C. or higher (YES in step S302), in step S303, the CPU 101 operates the cooling fan 119 at full speed. In step S304, the CPU 101 sets the timer 103 to give an alarm five minutes later.

If the CPU 101 determines that the temperature information is not 50° C. or higher (NO in step S302), in step S305, the CPU 101 determines whether the temperature information acquired in step S301 is 45° C. or higher. If the CPU 101 determines that the temperature information is 45° C. or higher (YES in step S305), in step S306, the CPU 101 operates the cooling fan 119 at half speed.

In step S307, the CPU 101 sets the timer 103 to give an alarm ten minutes later and the processing ends.

If the CPU 101 determines that the temperature information is not 45° C. or higher (NO in step S305), in step S308, the CPU 101 stops the operation of the cooling fan 119. In step S309, the CPU 101 determines whether the temperature information acquired in step S301 is 40° C. or higher. If the CPU 101 determines that the temperature information is 40° C. or higher (YES in step S309), in step S310, the CPU 101 sets the timer 103 to give an alarm five minutes later and the processing ends.

If the CPU 101 determines that the temperature information is not 40° C. or higher (NO in step S309), in step S311, the CPU 101 determines whether the temperature information acquired in step S301 is 30° C. or higher. If the CPU 101 determines that the temperature information is 30° C. or higher (YES in step S311), in step S312, the CPU 101 sets the timer 103 to give an alarm ten minutes later, and the processing ends.

Figure 4:
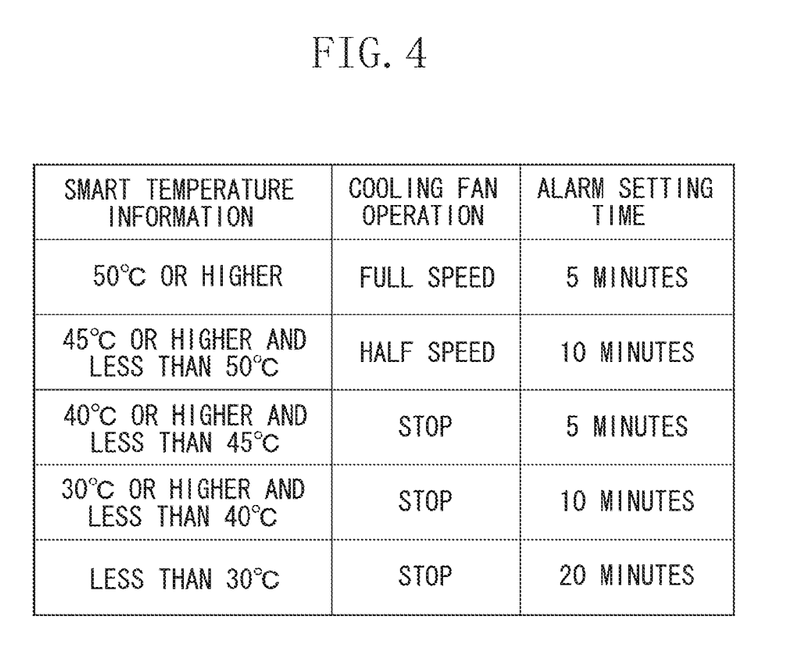
FIG. 4 illustrates a temperature information table.

If the CPU 101 determines that the temperature information is not 30° C. or higher (NO in step S311), in step S313, the CPU 101 sets the timer 103 to give an alarm twenty minutes later, and the processing ends. As described above, in the subroutine "SMART temperature control", the CPU 101 executes the operation control of the cooling fan 119 and the alarm setting for the timer 103 according to the temperature information of the SMART, as illustrated in FIG. 4.

The alarm setting time in the present exemplary embodiment is an example. The alarm setting time is predetermined so that the HDD 112 does not exceed a specified operating temperature range even if the image forming apparatus 100 is under the worst condition in terms of temperature, and is stored in the ROM 110 or the SRAM 102. More specifically, the worst condition in terms of temperature refers to the condition in which "the cooling fan 119 is stopped, the power consumption of the controller unit 120 is large, and the operation rate of the HDD 112 is high". The alarm setting time for the cooling fan 119 in operation can be arbitrarily made.

According to the present exemplary embodiment, the timing of when to acquire the temperature information next is changed depending on the acquired temperature information of the SMART, so that the quietness of the image forming apparatus 100 and the operation of the HDD 112 within the specified operating temperature range can be made compatible with each other without reducing the reliability of the HDD 112.

A second exemplary embodiment describes an example of control performed by the CPU 101 in consideration of a standby state where no processing is performed by the image forming apparatus 100. Because a heat generation amount of the controller unit 120 is small when the image forming apparatus 100 is in the standby state, the temperature of the HDD 112 does not exceed the specified operating temperature range in many cases even if the cooling fan 119 is stopped. Thus, the second exemplary embodiment is effective for such an image forming apparatus.

The state where the image forming apparatus 100 is not in the standby state, for example, refers to the one that the user is operating the operation unit or the image data stored in the HDD 112 is being accessed by an PC or another image forming apparatus connected to the network 116.

In the present exemplary embodiment, the hardware configuration of the image forming apparatus 100 is similar to that illustrated in FIG. 1, and the description thereof will thus be omitted.

Figure 5:
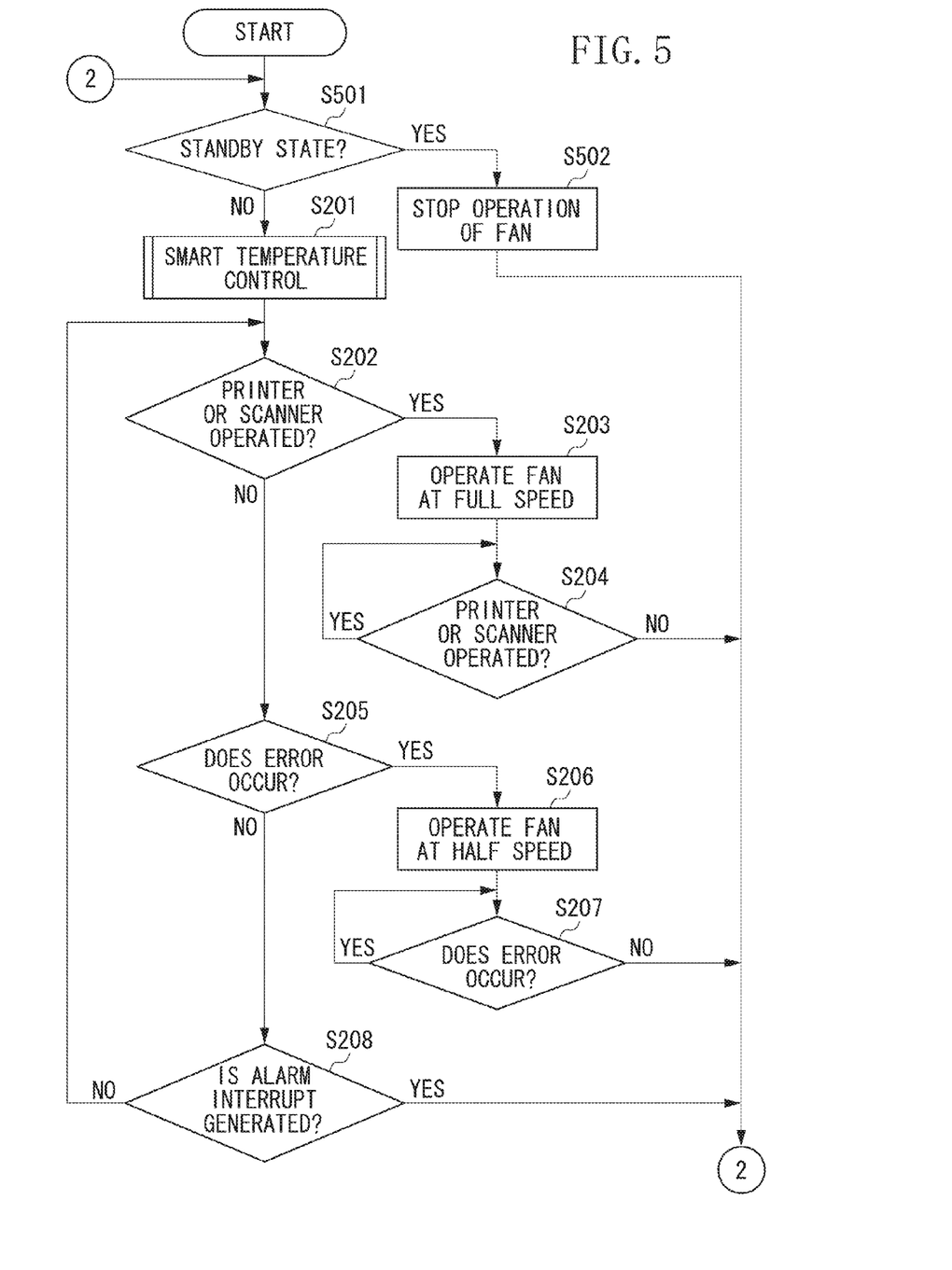
FIG. 5 is a flowchart illustrating a method for controlling the image forming apparatus.

FIG. 5 is a flowchart illustrating a method for controlling the image forming apparatus 100 according to the present exemplary embodiment. This example corresponds to an example of fan control operation performed by the CPU 101 for controlling the cooling fan 119 illustrated in FIG. 1. Each step is realized by the CPU 101 executing a control program stored in the ROM 110.

In step S501, the CPU 101 determines whether the image forming apparatus 100 is in a standby state. If the CPU 101 determines that the image forming apparatus 100 is in a standby state (YES in step S501), in step S502, the CPU 101 stops the cooling fan 119 and the processing returns to step S501.

If the CPU 101 determines that the image forming apparatus 100 is not in a standby state (NO in step S501), in step S201, the CPU 101 executes the subroutine "SMART temperature control". The operation of the CPU 101 in the subroutine "SMART temperature control" in step S201 is similar to that in step S201 according to the first exemplary embodiment, and the description thereof will thus be omitted.

After the subroutine "SMART temperature control" in step S201 is executed, in step S202, the CPU 101 determines whether the printer 114 or the scanner 108 is operated. If the CPU 101 determines that the printer 114 or the scanner 108 is operated (YES in step S202), in step S203, the CPU 101 operates the cooling fan 119 at full speed.

In step S204, the CPU 101 determines whether the printer 114 or the scanner 108 is operated. If the CPU 101 determines that the printer 114 or the scanner 108 is not operated (NO in step S204), the processing returns to step S501.

On the other hand, if the CPU 101 determines that the printer 114 or the scanner 108 is not operated (NO in step S202), in step S205, the CPU 101 determines whether an error such as a jam occurs. If the CPU 101 determines that an error occurs (YES in step S205), in step S206, the CPU 101 operates the cooling fan 119 at half speed.

In step S207, the CPU 101 determines whether an error occurs. If the CPU 101 determines that an error does not occur (NO in step S207), the processing returns to step S501.

On the other hand, if the CPU 101 determines that an error such as a jam does not occur (NO in step S205), in step S208, the CPU 101 determines whether the timer 103 generates an alarm interrupt. If the CPU 101 determines that the timer 103 generates an alarm interrupt (YES in step S208), the processing returns to step S501.

If the CPU 101 determines that the timer 103 does not generate an alarm interrupt (NO in step S208), the processing returns to step S202.

According to the present exemplary embodiment, a determination is made as to whether the image forming apparatus 100 is in a standby state, and if the image forming apparatus 100 is determined to be in a standby state, the temperature information of the SMART is not acquired. This can suppress an increase in the number of times of loading/unloading of the HDD 112.

In a third exemplary embodiment, the subroutine "SMART temperature control" executed by the CPU 101 when data is written to or read from the HDD 112 is added to the first exemplary embodiment.

In the present exemplary embodiment, the hardware configuration of the image forming apparatus 100 is similar to that in FIG. 1, and the description thereof will thus be omitted.

Figure 6:
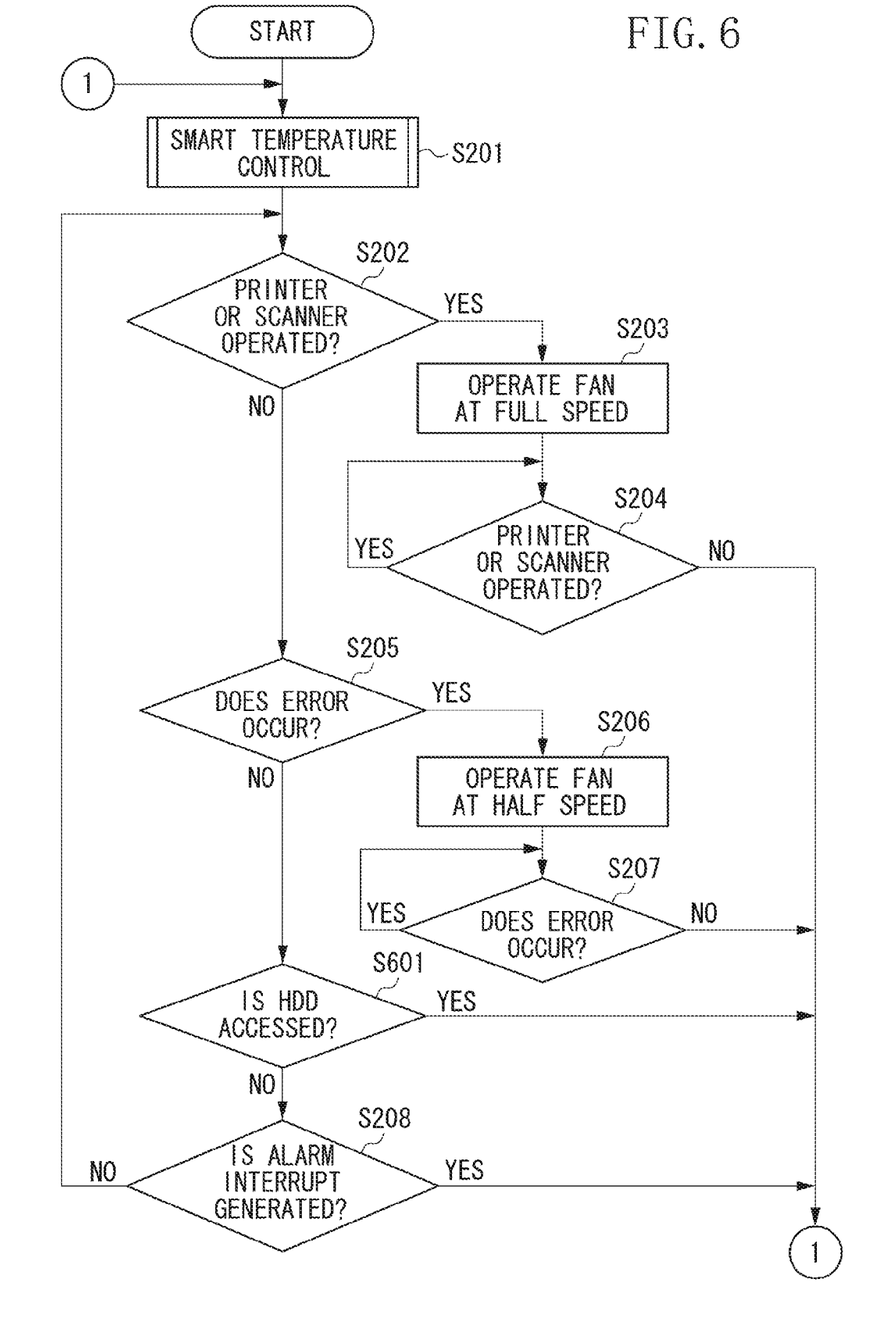
FIG. 6 is a flowchart illustrating a method for controlling the image forming apparatus.

FIG. 6 is a flowchart illustrating a method for controlling the image forming apparatus 100 according to the present exemplary embodiment. This example corresponds to an example of fan control operation performed by the CPU 101 for controlling the cooling fan 119 illustrated in FIG. 1. Each step is realized by the CPU 101 executing a control program stored in the ROM 110.

In step S201, the CPU 101 executes the subroutine "SMART temperature control". The operation of the CPU 101 in the subroutine "SMART temperature control" in step S201 is similar to that in step S201 according to the first exemplary embodiment, and the description thereof will thus be omitted.

After the subroutine "SMART temperature control" in step S201 is executed, in step S202, the CPU 101 determines whether the printer 114 or the scanner 108 is operated. If the CPU 101 determines that the printer 114 or the scanner 108 is operated (YES in step S202), in step S203, the CPU 101 operates the cooling fan 119 at full speed.

In step S204, the CPU 101 determines whether the printer 114 or the scanner 108 is operated. If the CPU 101 determines that the printer 114 or the scanner 108 is not operated (NO in step S204), the processing returns to step S201.

On the other hand, if the CPU 101 determines that the printer 114 or the scanner 108 is not operated (NO in step S202), in step S205, the CPU 101 determines whether an error such as a jam occurs. If the CPU 101 determines that an error occurs (YES in step S205), in step S206, the CPU 101 operates the cooling fan 119 at half speed. In step S207, the CPU 101 determines whether an error occurs. If the CPU 101 determines that an error does not occur (NO in step S207), the processing returns to step S201.

On the other hand, if the CPU 101 determines whether an error such as a jam does not occur (NO in step S205), in step S601, the CPU 101 determines whether data is written to or read from the HDD 112. If the CPU 101 determines that data is written to or read from the HDD 112 (YES in step S601), the processing returns to step S201 to execute the subroutine "SMART temperature control".

If the CPU 101 determines that data is neither written to nor read from the HDD 112 (NO in step S601), in step S208, the CPU 101 determines whether the timer 103 generates an alarm interrupt. If the CPU 101 determines that the timer 103 generates an alarm interrupt (YES in step S208), the processing returns to step S201.

If the CPU 101 determines that the timer 103 does not generate an alarm interrupt (NO in step S208), the processing returns to step S202.

According to the present exemplary embodiment, if the HDD 112 is accessed, the CPU 101 subsequently acquire the temperature information of the SMART and resets the alarm time for the timer 103, which can suppress an increase in the number of times of loading/unloading of the HDD 112.

The first to third exemplary embodiments have described the case in which, if the CPU 101 determines that an error such as a jam occurs, the cooling fan 119 is operated at half speed. However, the present invention is not limited to the above exemplary embodiments, and the cooling fan 119 may be operated at full speed, for example. Further, control is not necessarily required when an error occurs. Only control according to the temperature information of the SMART may be performed, irrespective of the occurrence of an error. A fourth exemplary embodiment describes an example of how to control the cooling fan 119 in a case where control is not performed when an error occurs.

In the present exemplary embodiment, the hardware configuration of the image forming apparatus 100 is similar to that in FIG. 1, and the description thereof will thus be omitted.

Figure 7:
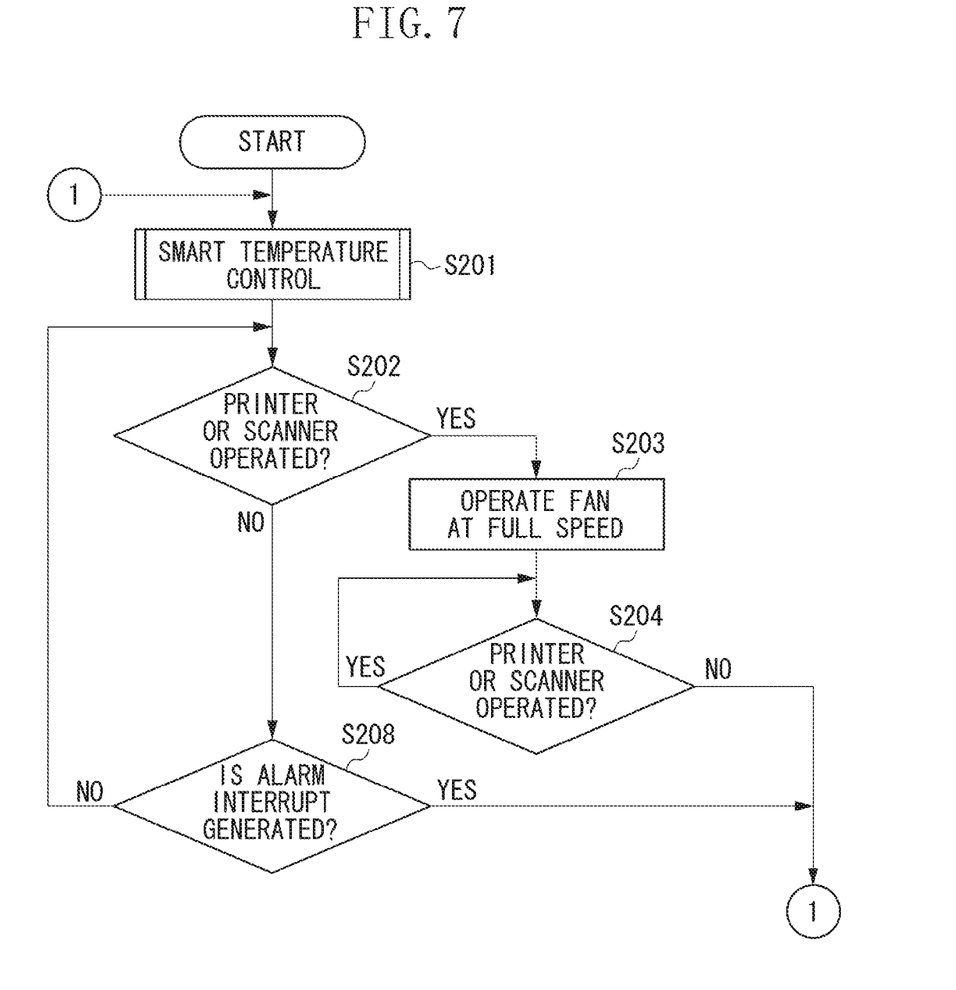
FIG. 7 is a flowchart illustrating a method for controlling the image forming apparatus.

FIG. 7 is a flowchart illustrating a method for controlling the image forming apparatus 100 according to the present exemplary embodiment. This example corresponds to an example of fan control operation performed by the CPU 101 for controlling the cooling fan 119 illustrated in FIG. 1. Each step is realized by the CPU 101 executing a control program stored in the ROM 110.

In step S201, the CPU 101 executes the subroutine "SMART temperature control". The operation of the CPU 101 in the subroutine "SMART temperature control" in step S201 is similar to that in step S201 according to the first exemplary embodiment, and the description thereof will thus be omitted.

After the subroutine "SMART temperature control" in step S201 is executed, in step S202, the CPU 101 determines whether the printer 114 or the scanner 108 is operated. If the CPU 101 determines that the printer 114 or the scanner 108 is operated (YES in step S202), in step S203, the CPU 101 operates the cooling fan 119 at full speed.

In step S204, the CPU 101 determines whether the printer 114 or the scanner 108 is operated. If the CPU 101 determines that the printer 114 or the scanner 108 is not operated (NO in step S204), the processing returns to step S201.

On the other hand, if the CPU 101 determines that the printer 114 or the scanner 108 is not operated (NO in step S202), in step S208, the CPU 101 determines whether the timer 103 generates an alarm interrupt. If the CPU 101 determines that the timer 103 generates an alarm interrupt (YES in step S208), the processing returns to step S201.

If the CPU 101 determines that the timer 103 does not generate an alarm interrupt (NO in step S208), the processing returns to step S202.

According to the present exemplary embodiment, the timing of when to acquire the temperature information next is changed depending on the acquired temperature information of the SMART, irrespective of the occurrence of an error, so that the reliability of the HDD 112 can be prevented from being lowered.

In the first to fourth exemplary embodiments, the timer 103 is assumed to be independent. However, the timer 103 may be a timer function incorporated into the CPU 101.

In the first to fourth exemplary embodiments, three states of stop, half speed, and full speed have been described as the operating state of the cooling fan 119. However, the present invention is not limited to the above states. As a fifth exemplary embodiment, for example, the number of rotations of the cooling fan 119 may be changed by changing the voltage supplied to the cooling fan 119 according to the acquired temperature information of the SMART.

The above exemplary embodiments have described in detail the case in which the timing of when to acquire the temperature information next is changed by acquiring the temperature information from the storage unit. However, the cooling level of the cooling fan 119 and the timing of acquiring the SMART information (such as temperature information and the number of times of loading/unloading of data) may be controlled by acquiring the number of times of loading/unloading of data from the storage unit and then comparing it with a preset threshold value.

Each step in the exemplary embodiments of the present invention can be realized by acquiring software (a program) via a network or various storage media and executing the program on a processing unit (such as a CPU or a processor) of a personal computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-091225 filed Apr. 25, 2014, which is hereby incorporated by reference herein in its entirety.

What is claimed is:
1. An image forming apparatus comprising:
a memory storing instructions;
one or more processors that executes the instructions and controls,
a control unit configured to control writing or reading data to or from a storage; and
a determining unit configured to determine whether the writing or reading of data occurs in the storage;
an obtaining unit configured to obtain temperature information from the storage at least in a case where the determining unit determines that the writing or reading of data occurs in the storage;

a cooling unit, including a fan, configured to perform a cooling operation on the control unit and the storage to cool the control unit and the storage, wherein the control unit controls a number of times of rotation in a predetermined time period of the fan in accordance with the obtained temperature information, and controls the obtaining unit to obtain temperature information from the storage and uses the temperature information obtained from the storage by the obtaining unit to control a timing of when to obtain the temperature information next from the storage and the number of times of rotation in the predetermined time period, wherein the next time to obtain the temperature information and the number of times of rotation in the predetermined time period are determined based on the temperature information obtained from the storage;

a printer configured to print an image on a sheet; and a scanner configured to scan an image of a document, wherein in a case where the printer and the scanner are in a standby state where the printer and the scanner is not operated, the control unit does not control the obtaining unit to execute obtaining temperature information and wherein the control unit controls the fan not to operate in accordance that the printer and the scanner are in the standby state where the printer and the scanner are not operated.

2. The image forming apparatus according to claim 1, wherein if temperature identified by the temperature information obtained from the storage is lower than a predetermined threshold value, the control unit controls the cooling unit to stop a cooling operation, and controls changing, depending on the number of times of rotation in the predetermined time period, the timing of when to obtain the temperature information from the storage.

3. The image forming apparatus according to claim 1, wherein if the printer and the scanner is in a standby state where the printer and the scanner is not operated, the control unit does not control the obtaining unit to execute obtaining temperature information measured by a self-diagnosis function of the storage.

4. The image forming apparatus according to claim 3, wherein if the printer or the scanner is in an operating state, the control unit controls the cooling unit to perform a cooling operation.

5. The image forming apparatus according to claim 1, wherein the control unit controls the timing of when to obtain the temperature information next from the storage and the number of times of rotation in the predetermined time period of the cooling unit, according to execution of writing or reading data to or from the storage.

6. The image forming apparatus according to claim 1, wherein the storage is a hard disk drive including a self-diagnosis function to detect temperature.

7. The image forming apparatus according to claim 1, wherein the temperature information is included in self-monitoring analysis and reporting technology (SMART) information in the storage.

8. A method for controlling an image forming apparatus including a control unit configured to control writing or reading data to or from a storage and a cooling unit, including a fan, configured to perform a cooling operation on the control unit and the storage to cool the control unit and the storage, printer configured to print an image on a sheet and a scanner configured to scan an image of a document, the method comprising:

determining whether the reading or writing of data occurs in the storage;

causing the control unit to obtain temperature information from the storage at least in a case where it is determined that the reading or writing of data occurs in the storage;

controlling a number of times of rotation in a predetermined time period of the fan in accordance with the obtained temperature information;

controlling a timing of when to obtain the temperature information next from the storage; and controlling the number of times of rotation in the predetermined time period using the temperature information obtained from the storage, wherein the next time to obtain the temperature information and the number of times of rotation in the predetermined period is determined based on the temperature information obtained from the storage, and in a case where the printer and scanner are in a standby state where the printer and scanner are not operated, the control unit does not obtain temperature information.

9. A non-transitory computer-readable storage medium storing a instructions that, when executed by a one or more processors, causes an image forming apparatus to execute a method for controlling an image forming apparatus including a control unit configured to control writing or reading data to or from a storage and a cooling unit, including a fan, configured to perform a cooling operation on the control unit and the storage to cool the control unit and the storage, a printer configured to print an image on a sheet and a scanner configured to scan an image of a document, the method comprising:

determining whether the reading or writing of data occurs in the storage;

causing the control unit to obtain temperature information from the storage at least in a case where it is determined that the reading or writing of data occurs in the storage;

controlling a number of times of rotation in a predetermined time period of the fan in accordance with the obtained temperature information;

controlling a timing of when to obtain the temperature information next from the storage; and controlling the number of times of rotation in the predetermined time period using the temperature information obtained from the storage, wherein the next time to obtain the temperature information and the number of times of rotation in the predetermined time period is determined based on the temperature information obtained from the storage, and in a case where the printer and scanner are in a standby state where the printer and scanner are not operated, the control unit does not obtain temperature information.

10. An image forming apparatus having a printing unit, the image forming apparatus comprising:

a memory storing instructions;

one or more processors that executes the instructions and controls;

a measurement unit configured to measure a temperature of a storage;

a storage configured to store in the storage temperature information indicating the temperature measured by the measurement unit;

a determining unit configured to determine whether the writing or reading of data occurs in the storage;

an obtaining unit configured to obtain temperature information indicating the measured temperature from the storage at least in a case where the determining unit determines that the writing or reading of data occurs in the storage;

a control unit configured to control the temperature inside the image forming apparatus based on the temperature information obtained by the obtaining unit by performing an active cooling operation inside the image forming apparatus by controlling a number of times of rotation of a fan in a predetermined time period in accordance with the obtained temperature information;

a setting unit configured to set a time interval for storing the temperature information indicating the measured temperature in the storage and obtaining the stored temperature information from the storage to a first interval when the temperature information stored by the storage is a predetermined value or higher, and to set the time interval to a second interval longer than the first interval when the temperature information stored by the storage is less than the predetermined value; a printer configured to print an image on a sheet; and a scanner configured to scan an image of a document, wherein in a case where the printer and scanner are in a standby state where the printer and scanner are not operated, the control unit does not control the obtaining unit to execute obtaining temperature information.

11. The image forming apparatus according to claim 10, wherein the control unit controls the temperature inside the image forming apparatus by controlling a number of times of rotation of a fan in the predetermined time period.

12. The image forming apparatus according to claim 10, wherein the control unit controls the fan to rotate a higher number of times in the predetermined period when the temperature information stored by the storage indicates the predetermined value or higher than when the temperature information stored by the storage is less than the predetermined value.

13. A method for controlling an image forming apparatus including a printer configured to print an image on a sheet and a scanner configured to scan an image of a document, the method comprising:

measuring a temperature of a storage;

storing, in the storage, temperature information indicating the measured temperature;

determining whether writing or reading of data occurs in the storage;

obtaining temperature information indicating the measured temperature from the storage at least in a case where it is determined that they writing or reading of data occurs in the storage;

controlling the temperature inside the image forming apparatus based on the obtained temperature information by performing an active cooling operation inside the image forming apparatus by controlling a number of times of rotation of a fan in a predetermined time period in accordance with the obtained temperature information; and setting a time interval for storing the measured temperature and obtaining the stored temperature information to a first interval when the stored temperature information is a predetermined value or higher, and setting the time interval to a second interval longer than the first interval when the stored temperature information is less than the predetermined value, wherein, in a case where the printer and scanner are in a standby state where the printer and scanner are not operated, not obtaining temperature information and controlling a number of times a rotation of a fan in accordance with the obtained temperature information.

14. A non-transitory computer-readable storage medium storing a instructions that, when executed by a one or more processors, causes an image forming apparatus including a printer configured to print an image on a sheet and a scanner configured to scan an image of a document to execute a method for controlling the image forming apparatus, the method comprising:

measuring a temperature of a storage;

storing, in the storage, temperature information indicating the measured temperature;

determining whether writing or reading of data occurs in the storage;

obtaining temperature information indicating the measured temperature from the storage at least in a case where it is determined that the writing or reading of data occurs in the storage;

controlling the temperature inside the image forming apparatus based on the obtained temperature information by performing an active cooling operation inside the image forming apparatus by controlling a number of times of rotation of a fan in a predetermined time period in accordance with the obtained temperature information; and setting a time interval for storing and obtaining the stored temperature information to a first interval when the stored temperature information indicates a predetermined value or higher, and setting the time interval to a second interval longer than the first interval when the stored temperature information indicates less than the predetermined value, wherein, in a case where the printer and scanner are in a standby state where the printer and scanner are not operated, not obtaining temperature information and controlling a number of times a rotation of a fan in accordance with the obtained temperature information.

* * * * *